United States Patent [19]

Hunter et al.

[11] Patent Number: 5,449,397
[45] Date of Patent: Sep. 12, 1995

[54] BIOCATALYZED LEACHING OF PRECIOUS METAL VALUES

[76] Inventors: Robert M. Hunter; Frank M. Stewart, both of 320 S. Willson Ave., Bozeman, Mont. 59715

[21] Appl. No.: 265,322

[22] Filed: Jun. 24, 1994

[51] Int. Cl.⁶ .......................................... C22B 11/00
[52] U.S. Cl. .............................. 75/744; 423/DIG. 17
[58] Field of Search ................... 75/744; 423/DIG. 17

[56] References Cited

U.S. PATENT DOCUMENTS

| | | | |
|---|---|---|---|
| 4,778,519 | 10/1988 | Pesic | 75/744 |
| 4,822,413 | 4/1989 | Pooley | 75/744 |
| 4,902,345 | 2/1990 | Ball | 75/744 |
| 4,987,081 | 1/1991 | Hackl | 435/262 |
| 5,076,927 | 12/1991 | Hunter | 210/603 |
| 5,127,942 | 7/1992 | Briereley | 75/743 |
| 5,246,486 | 9/1993 | Briereley | 75/743 |

FOREIGN PATENT DOCUMENTS 2180829  4/1987  United Kingdom .

Primary Examiner—Peter D. Rosenberg

[57] ABSTRACT

A biohydrometallurgical apparatus and method for extracting precious metals, including gold and silver, from oxidized ore by means of leaching with a neutral bisulfide solution instead of cyanide, thiourea, thiosulfate, or other conventional lixiviants is disclosed. In a preferred embodiment, a first process step of conventional bio-oxidation of ore particles is accomplished to free precious metals dispersed or occluded within the ore. A portion of the acidic, base-metal sulfate leach solution produced by bio-oxidation is introduced to an anaerobic reactor. In a heap leach embodiment of the process, the anaerobic reactor is a side-stream reactor. In an alternative slurry (e.g., vat) leaching embodiment, the anaerobic process may occur on-line. A preferably non-toxic electron donor, such as acetate or methanol (which does not bind effectively to activated carbon), is added to the anaerobic reactor to enrich within it a mixed culture of sulfate-reducing bacteria. The anaerobic reactor may be operated in a pH-stat mode by adding sufficient acidic sulfate solution to maintain a neutral pH in the reactor. In a second process step, the oxidized ore (possibly covered and submerged to exclude oxygen) is leached by recirculating the neutral bisulfide lixiviant saturated with $H_2S$ through it in a leaching reactor. Precious metal values are recovered from the pregnant bisulfide solution by contact with activated carbon or other conventional techniques.

20 Claims, 4 Drawing Sheets

BIOCATALYZED LEACHING OF PRECIOUS METAL VALUES

This invention was made with Government support under Contract No. DAAH01-922-C-R068 awarded by the Advanced Research Projects Agency, a component of the U.S. Department of Defense. The Government has certain rights in the invention.

BACKGROUND OF THE INVENTION

This invention relates to the field of biohydrometallurgy. In particular, it relates to biocatalyzed leaching of precious metals, such as gold and silver, from their ores.

Development of cost-effective techniques for extraction of gold and silver from their ores has been a goal of metallurgists for hundreds of years. In recent years, incorporation of the environmental costs into the total cost of the products of gold and silver miners has encouraged a search for environmentally acceptable options.

Since its invention in 1899 by Charles Merrill of Homestake Mining Company, cyanidation has been the process of choice for extraction of gold and silver from oxidized ores. The cyanidation process is not without its limitations, however. A primary limitation is the toxicity of the leaching agent, the cyanide ion. The average fatal dose of hydrogen cyanide (HCN) for humans is 50 to 60 milligrams (McKee, J. E., & Wolf, H. W. Water Quality Criteria, 3-A, California State Water Resources Control Board, 1963). Concentrations of 0.10 to 0.15 milligrams per liter of HCN are lethal to trout.

Another limitation of the cyanidation process is that it is effective only if the ore to be leached is in an oxidized state. Typically, non-oxidized (e.g., sulfide) ores (especially those with a relatively high carbon content) are oxidized at elevated temperatures and pressures in large autoclaves, i e., "roasted", prior to cyanide leaching (McQuiston, Jr., F. W., & Shoemaker, R. S., *Gold and Silver Cyanidation Plant Practice*, Vol. II, Baltimore: Port City Press, 1980). As near-surface, oxidized ore reserves are mined out, however, increasing reliance must be placed on deeper, "refractory" sulfide ores.

During the last decade, heap leach processes for cost-effective bio-oxidation of pyritic and arsenopyritic sulfides in gold and silver ores have been developed to the point of commercial application (Torma, A. E., *Biotechnology: A Comprehensive Treatise in 8 Volumes*, Deerfield Beach, Fla.: Verlag Chemie, 1981). Recent improvements in the art are disclosed in U.S. Pat. Nos. 4,822,413, 4,987,081, 5,076,927, 5,127,942 and 5,246,486 which disclosures are incorporated by reference herein as if fully set forth (Pooley et al, U.S. Pat. No. 4,822,413, Apr. 18, 1989; Hackl et al, U.S. Pat. No. 4,987,081, Jan. 22, 1991; Hunter, U.S. Pat. No. 5,076,927 Dec. 31, 1991; Brierly et al, U.S. Pat. No. 5,127,942, Jul. 7, 1992). A great variety of precious metal extraction processes have also been developed (Gupta, C. K., & Mukherjee, T. K., *Hydrometallurgy in Extraction Processes*, Vol. I, Boston: CRC Press, 1990). Precious metal extraction processes are disclosed in U.S. Pat. Nos. 4,778,519 and 4,902,345 and in UK Patent No. 8,622,561, which disclosures are incorporated by reference herein as if fully set forth (Pesic, U.S. Pat. No. 4,778,519, Oct. 18, 1988; Ball et al, U.S. Pat. No. 4,902,345, Feb. 20, 1990; UK Patent No. 2,180,829, Apr. 8, 1997). The low economic cost of cyanidation however, has ensured its proliferation.

State-of-the-art precious metal heap leach practice varies with the nature of the ore. Bio-oxidation process steps may include ore crushing, acid pretreatment, inoculation with appropriate sulfide-oxidizing bacteria, addition of nutrients, recirculating the biolixiviant and cooling the heap (for 3 to 8 days), and allowing the heap to "rest" (for 3 to 8 days). Precious metal extraction process steps may include washing the heap for an extended period (e.g., 14 days) to remove residual acidity or iron content, breaking the heap apart in order to agglomerate it with cement and/or lime to make a new heap, leaching it with an alkaline cyanide or thiosulfate solution for 30 to 40 days, and recovery of gold and silver from the leach solution by adsorption on activated carbon or zinc dust precipitation.

The cyanide extraction reaction proceeds in two stages as follows (Gupta, C. K., & Mukherjee, T. K., *Hydrometallurgy in Extraction Processes*, Vol. I, Boston: CRC Press, 1990):

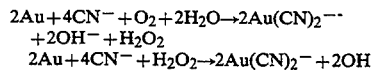

The cyanide leach solution typically contains 0.25 kg of NaCN per 1,000 kg of solution (about130 mg $CN^-$/l) and is maintained at about pH 10.5.

In that cyanidation is an open air (aerobic) process, it cannot operate in the winter when freezing of leach solutions would occur (unless the leach solution can be heated) (McQuiston, Jr., F. W., & Shoemaker, R. S., *Gold and Silver Cyanidation Plant Practice*, vol. II, Baltimore: Port City Press, 1980). Excess cyanide lixiviant must be oxidized (biologically or chemically, e.g., with chlorine) and, if chlorinated, dechlorinated prior to release to the environment.

A significant amount of work in the field of bio-oxidation and metals extraction has been accomplished by a variety of investigators. Tomizuka and Yagisawa describe a two-step process for leaching of uranium and oxidation of lead sulfide with recovery of metals by means of microbial sulfate reduction. Torma (1981) reviews bioleaching processes (Tomizuka, N., & Yagisawa, M. in *Metallurgical Applications of Bacterial Leaching and Related Microbiological Phenomena*, (eds.) Murr, L. E., Torma, A. E., & Brierley, J. A., New York: Academic Press, 1978). Livesey-Goldblatt describes a process for gold recovery from arsenopyrite/pyrite ore by bacterial leaching and cyanidation (Livesay-Goldblatt, E. 89–96, 1985. Fundamental and Applied Biohydrometallurgy. Proc. 6th International Symposium on Biohydrometallurgy, Vancouver, B.C. 89–96, 1986). Hackl et al. describe development of the BIOTANK-LEACH process for leaching pyritic materials from gold and silver ore (Hackl, R. P., Wright, F., & Bruynesteyn, A., *Proceedings of the Third Annual General Meeting of Biominet*, Aug. 20–21, 71–90, 1986). The results of bench-scale and pilot-scale evaluations are presented. Marchant and Lawrence list considerations in the design of commercial bio-oxidation plants (Marchant, P. B., & Lawrence, R. W., *Proceedings of the Third Annual General Meeting of Biominet*, Aug. 20–21, 39–51, 1986). The benefits of using the BacTech moderately thermophilic cultures in bio-oxidation processes are discussed by Budden and Spencer (Budden, J. R., & Spencer, P. A., FEMS Microbiology Reviews, 11, 191-196, 1993). Chapman et al. (1993) describe a modular mobile bioleach pilot plant for bio-oxidation of a refractory gold-bearing high-arsenic sulfide concentrate.

Thermophilic versus mesophilic bioleaching process performance is evaluated by Duarte et al. (Duarte, J. C., Estrada, P. C., Pereira, P. C., & Beaumont, H. P., *FEMS Microbiology Reviews*, 11, 97-102, 1993). Two years of BIOX bio-oxidation pilot plant data are analyzed by Hansford and Miller (Hansford, G. S., & Miller, D. M., *FEMS Microbiology Reviews*,11, 175-182, 1993). Hoffman et al. (1993) describe the design of a reactor bioleach process for refractory gold treatment. Liu et al. present an evaluation of the effects of process variables on pyrite/arsenopyrite oxidation and gold extraction (Liu, X., Petersson, S., & Sandstrom, A., *FEMS Microbiology Reviews*, 11, 207-214, 1993). Maturana et al. describe an integrated biological process for treatment of a complex gold ore(Maturana, H., Lagos, U., Flores, V., Gaeta, M., Cornejo, L., & Wiertz, J. V., *FEMS Microbiology Reviews*, 11, 215-220, 1993). Mineral sulfide oxidation by enrichment cultures of a novel thermoacidophilic bacteria are described by Norris and Owen (1993). Rate controls on the bio-oxidation of heaps of pyritic material imposed by bacterial upper temperature limits are described by Pantelis and Ritchie (Pantelis, G., & Ritchie, A.I.M., *FEMS Microbiology Reviews*, 11, 183-190, 1993).

Bio-oxidation bacteria have been characterized in detail. Brierley and Brierley characterize a chemoautotrophic and thermophilic (70° C.) microorganism isolated from an acid hot spring (Brierley, C. L., & Brierley, J. A., *Canadian J. Microbiology*, 19, 183-188, 1973). De Rosa et al. characterize the extremely thermophilic (85° C.), acidophilic (pH 1.0) bacteria *Sulfolobus acidocaldarius* (De Rosa, M., Gambacorta, A., & Bullock, J. D., J. General Microbiology, 86, 156-164, 1975). Torma et al. present a kinetic analysis of the growth of *Thiobacillus ferrooxidans* in a synthetic medium (Torma, A. E., *Biotechnology: A Comprehensive Treatise in 8 Volumes*, Deerfield Beach, Fla.: Verlag Chemie, 1981).

Henley presents data characterizing the solubility of gold in chloride solutions in the temperature range 300°-500° C. (Henley, R. W., Chemical Geology, 11, 73-87, 1973). Puddephatt reviews the chemistry of gold (Puddephatt, R. J., *The Chemistry of Gold*, New York: Elsevier Scientific Pub. Co., 1978). The chemistry of thiourea and thiosulfate extraction of gold and silver is discussed by Block-Bolten et al. (Block-Bolten, A., Daita, M. S., Torma, A. E., & Steensma, R., *Recycle and secondary Recovery of Metals*, Pennsylvania: Metallurgical Society, Inc., 1985).

Hydrogen sulfide gas ($H_2S$) may be produced biologically by the action of sulfate-reducing bacteria. Hydrogen sulfide in aqueous solution is called hydrosulfuric acid. Hydrosulfuric acid ionizes as follows.

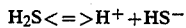

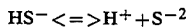

The $HS^-$ ion is called the bisulfide ion. The $S^{-2}$ ion is called the sulfide ion. At a partial pressure of one atmosphere, the solubility of $H_2S$ in water is about 3,400 mg/l (0.1 molar) at 25° C. and about 3,800 mg/l (0.11 molar) at 20° C., of which about half exists as $HS^-$ ion at pH 7.

Neutral bisulfide/sulfide solutions dissolve gold and silver by creating very stable bisulfide and sulfide complexes (Barnes, H. L. (ed.), *Geochemistry of Hydrothermal Ore Deposits*, 2nd ed., New York: John Wiley & Sons, 1979). Weissberg has estimated that, at 25° C. in neutral bisulfide solutions, gold has a solubility of 40mg/l in 0.17M $HS^-$and 125 mg/l in 0.32M $HS^-$at a pressure of 1,000 atmospheres (Weissberg, B. C., Economic Geology, 65, 551-556, 1970). Seward found that, in the region of alkaline pH, at temperatures below 200° C., "the effect of pressure on the solubility of gold is relatively minor." (Seward, T. M., Geochimica et Cosmochimica Acta, 37, 379-399, 1973) He also noted that "a pronounced solubility maximum occurs in the region of pH about 7 . . . " and that "higher hydrogen fugacities . . . considerably depress the solubility of gold." $Ag_2S$ solubility exceeds 10 mg/l in near-neutral solutions at 20° C. and increases to nearly 40mg/l at 100° C. (Barnes, H. L. (ed.), *Geochemistry of Hydrothermal Ore Deposits*, 2nd ed., New York: John Wiley & Sons, 1979)

In conventional bio-oxidation of gold and silver ores, a waste sulfuric acid stream is produced. Means for bioprocessing of this waste stream are disclosed in U.S. Pat. No. 5,076,927, which disclosure is incorporated by reference herein as if fully set forth.

SUMMARY OF THE INVENTION

For the purposes of this disclosure, the term "ore" means a composition that comprises precious metal values. Thus, ore may be a mined mineral assemblage or it may be a waste product, such as obsolete or damaged electronic components. The term "precious metals" means gold(Au), silver(Ag), and/or platinum group metals. The term "platinum group metals" means platinum(Pt), palladium(Pd), rhodium(Rh), ruthenium(Ru), osmium(Rh), and iridium(Ir). The term "bisufide lixiviant" means an aqueous solution comprising $HS^-$ions.

The present invention provides an apparatus and method for biocatalyzed leaching of precious metals from their ores by means of an essentially neutral leaching solution comprising bisulfide ions. Preferably, a bio-oxidation step for removing base-metal sulfides from low-grade gold and silver ores is coupled with a bisulfide gold and silver leaching step.

In a preferred embodiment, a first process step of conventional bio-oxidation of ore particles is accomplished to free precious metals dispersed or occluded within the ore. A portion of the acidic, base-metal sulfate leach solution produced by the bio-oxidation step is introduced to an anaerobic reactor. In a heap leach embodiment of the process, the anaerobic reactor is a side-stream reactor. In an alternative slurry (e.g.,vat) leaching embodiment, the anaerobic process may occur on-line. A preferably non-toxic electron donor, such as acetate or methanol (which does not bind effectively to activated carbon), is added to the anaerobic reactor to enrich within it a mixed culture of sulfate-reducing bacteria. The anaerobic reactor may be operated in a pH-stat mode by adding sufficient acidic sulfate solution to maintain a neutral pH in the reactor (Hunter, R. M., *Biocatalyzed Partial Demineralization of Acidic Metal-Sulfate Solutions*, Ph.D. Thesis, Montana State University, 1989). Base metals are preferably precipitated and a portion of the hydrogen sulfide gas ($H_2S$) produced in the anaerobic reactor is preferably removed. In this way, sulfate-reducing bacteria are used to create an essentially neutral leaching solution comprising bisulfide ions and a low concentration of dissolved base metals.

In a second process step, the oxidized ore (possibly covered and submerged to exclude oxygen) is leached by recirculating the neutral bisulfide lixiviant saturated with H₂S through it in a leaching reactor. In one embodiment, the H₂S partial pressure is increased by introducing the lixiviant under pressure at the bottom of a heap submerged in water, causing HS⁻ ion concentrations to increase in direct proportion to the increase in H₂S partial pressure. At a gold concentration of 10 mg/l, all of the gold in a ton of low grade (0.05 oz/ton) ore can be complexed in 140 liters of bisulfide leach solution.

In a preferred embodiment, the anaerobic reactor and the leaching reactor are operated together as a single, essentially completely-mixed reactor. An essentially completely mixed reactor is one that produces an effluent concentration of a conservative tracer (e.g., a non-reactive dye) equal to 37±3 percent of the initial tracer concentration (i.e., tracer mass divided by liquid volume) one detention time (i.e., liquid volume divided by liquid volumetric flow rate) after an impulse input (i.e., slug addition) of the tracer.

The complexed gold and silver is recovered continuously from the lixiviant solution. Recovery may be accomplished in a conventional manner by adsorption on activated carbon or by modifying either the solution pH, hydrogen fugacity, or oxidation-reduction potential (ORP).

The present invention provides a variety of advantages over the prior art. One object of the invention is lowering the lower monetary cost of gold and silver leaching. By utilizing a waste product (excess sulfuric acid from a bio-oxidation pretreatment step) as the starting material for preparation of a bisulfide lixiviant, the lixiviant (a neutral bisulfide solution) would be produced biologically instead of being purchased. Another object of the invention is to lower the environmental risk of gold mining. This is the case because the environmental risk of maintaining a large inventory of a neutral bisulfide solution is much lower than that associated with maintaining an equivalent volume of caustic cyanide solution. Further objects and advantages of the invention will become apparent from consideration of the drawings and the ensuing description of it.

BRIEF DESCRIPTION OF THE DRAWINGS

The features of the invention will be better understood by reference to the accompanying drawings which illustrate presently preferred embodiments of the invention.

In the drawings.

Figure 1:
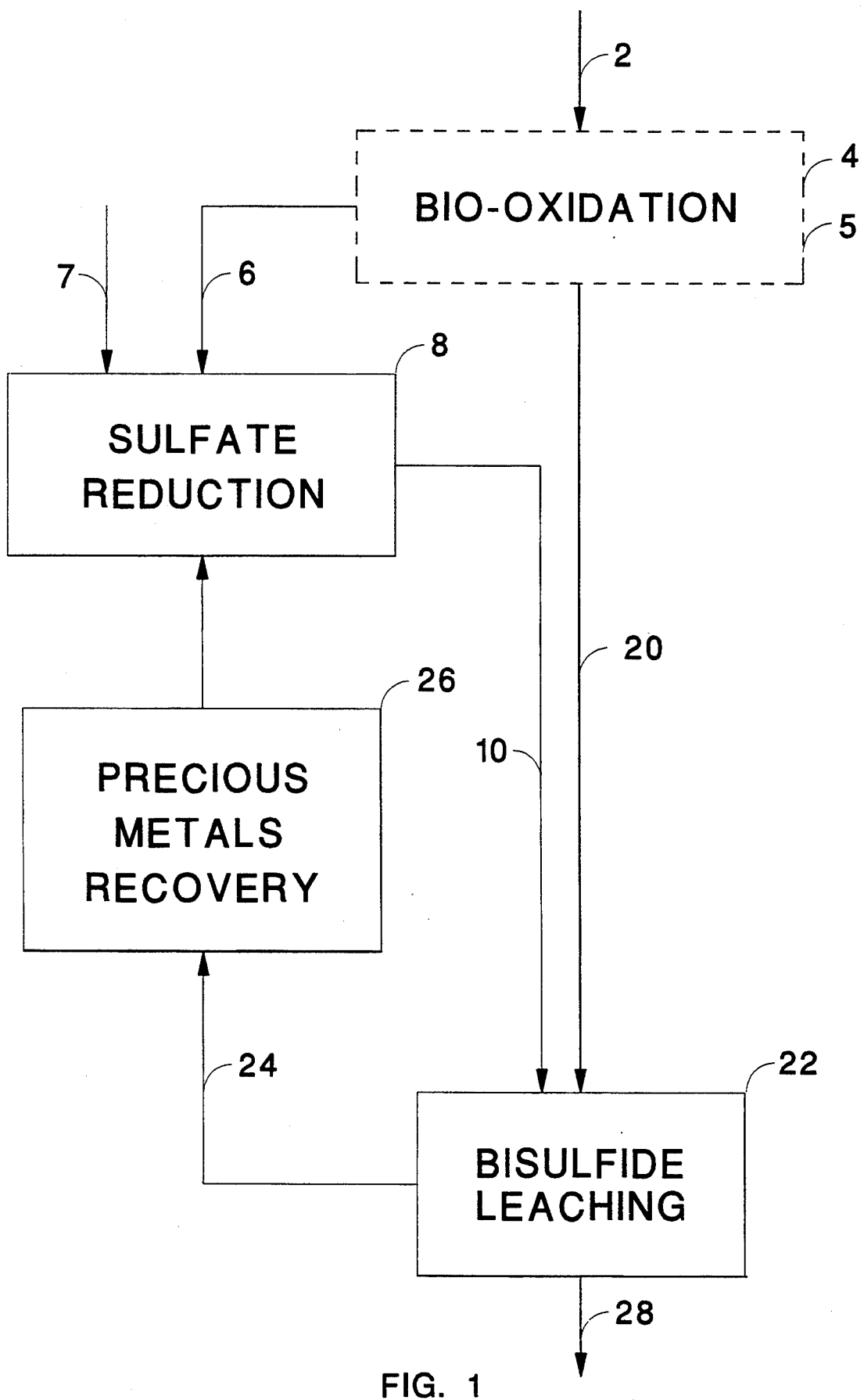
FIG. 1 is a highly schematic block diagram illustrating a first representative embodiment of the present invention.

The following reference numerals are used to indicate the parts of the invention on the drawings:

2 ore
4 bio-oxidation reactor
6 sulfate ions
7 electron donor
8 sulfate reduction reactor
20 oxidized ore
22 bisulfide leaching reactor
24 pregnant solution
26 precious metals recovery reactor
28 leached ore
30 ore
32 crushing
34 crushed ore
36 acid leaching
37 aerobic reactor
38 air
40 acid-leach solution
42 pump
44 acid-leached ore
46 bisulfide leaching
47 essentially completely-mixed, anaerobic reactor
48 bisulfide lixiviant
50 pump
60 pH controller
62 valve
64 valve
66 pregnant bisulfide lixiviant
68 gold and silver recovery
70 spent lixiviant
76 bisulfide lixiviant recirculation loop
78 activated carbon column
80 leached ore
82 sensor/controller
84 electron donor
90 dewatering
92 contained bisulfide lixiviant
94 waste ore
96 acid-leach solution portion
98 base metal removal
100 base metal removal reactor
104 iron and other base metals
110 excess hydrogen sulfide gas
112 excess hydrogen sulfide gas portion
114 sulfur recovery
116 sulfur recovery reactor
120 elemental sulfur
200 heap
202 heap, second heap
204 crushed ore
205 crushed ore, oxidized ore
206 air
208 plenum
210 acidic, base-metal sulfate leach solution
212 pump
214 portion
216 distributor
220 portion
230 anaerobic, sulfate-reduction reactor
232 pH controller
234 valve
238 bisulfide leach solution
240 non-toxic electron donor
244 base metals
250 settling tank
252 portion
254 clarified bisulfide lixiviant
260 headspace
262 headspace
264 conduit
266 excess hydrogen sulfide gas
270 sulfur recovery
272 elemental sulfur
282 bisulfide lixiviant
284 plenum
286 pump
290 distributor
292 portion
294 portion
300 pregnant portion
302 reactor
306 barren lixiviant solution
308 continuous Stirred tank reactor 310 ore slurry
312 personal computer-based monitor and control system
314 acid pump
316 acid reservoir
318 medium pump
320 mineral medium containing 100/L of methanal
322 activated carbon column
324 supernatant
326 solenoid valve
328 reactor headspace gas
330 saturated solution of zinc acetate
332 recirculation pump

DESCRIPTION OF THE PREFERRED EMBODIMENTS

Reference is now made to FIG. 1 which is a schematic block diagram illustrating a preferred embodiment of the invention, with the dashed lines representing possible variations in the process and apparatus. Ore 2 is the input to the process, and, under certain conditions, may be the only input to the process. In a preferred embodiment, ore 2 is crushed and may be otherwise treated to optimize bio-oxidation. In bio-oxidation reactor 4, oxidation of metal sulfides is accomplished to free precious metals dispersed or occluded within ore 2. Bio-oxidation reactor 4 produces a sidestream comprising sulfate ions 6 and acidity. In an alternative embodiment, bio-oxidation does not occur and sulfate ions 6 are an input to the process. Sulfate ions 6 may be a component of a waste stream, such as acid mine drainage.

Electron donor 7 is added to sulfate reduction reactor 8 so that sulfate ions 6 are biologically reduced therein. In a preferred embodiment, sulfate reduction reactor 8 is operated in a pH-stat mode so as to maintain an essentially constant pH ($\pm 0.1$ pH unit) in reactor 8 and in bisulfide lixiviant 10 that it produces.

Oxidized ore 20 is introduced to bisulfide leaching reactor 22. In reactor 22, precious metal values in oxidized ore 20 are dissolved and complexed by means of bisulfide lixiviant 10. Pregnant solution 24 comprising precious metal values is introduced to precious metals recovery reactor 26 for precious metals recovery in a conventional manner by adsorption on activated carbon or by modifying either the solution pH, hydrogen fugacity, or oxidation-reduction potential (ORP). Leached ore 28 is disposed of in a conventional manner and need not be treated for removal of lixiviant.

It is well known in the art that the composition of ores varies widely, requiring optimization of the leaching step based on ore compositions and other local conditions. For this reason, design and operation of reactors 8 and 26 is preferably optimized for precious metal dissolution and complex formation. Depending on ore composition, design and/or operation are varied to achieve the following conditions:

1. Maximize dissolved bisulfide concentration
2. Optimize pH
3. Minimize dissolved hydrogen concentration (fugacity)
4. Maximize pressure
5. Maximize temperature For gold and/or silver leaching, the following information on the aqueous chemistry of gold and silver bisulfide complexes and other chemical species likely to be present in a bisulfide lixiviant is used (Barnes, H. L. (ed.), *Geochemistry Of Hydrothermal Ore Deposits*, 2nd ed., New York: John Wiley & Sons, 1979):

| Reaction | Log K | Temp., °C. |
|---|---|---|
| $Ag^+ + 2HS^- <=> Ag(HS)_2^-$ | 17.17 | 25 |
| $Cu_2S + 5HS^- + H^+ <=> 2Cu(HS)_3^{-2}$ | 2.02 | 22 |
| $Au + H_2S(aq) + HS^- <=> Hu(HS)_2^- + 1/2H_2 (g)$ | $-1.29$ | 175 |
| $ZnS + H_2S(aq) + HS^- <=> Zn(HS)_3^-$ | $-3.0$ | 25 |
| $HgS + H_2S(aq) + HS^- <=> Hg(SH)_3^-$ | $-3.50$ | 20 |
| $PbS + H_2S(aq) + HS^- <=> Pb(SH)_3^-$ | $-5.62$ | 25 |

In a preferred embodiment, bisulfide ions are generated biologically (by naturally-occurring sulfate-reducing bacteria) at very low cost using an acidic waste product (bio-oxidation heap leach effluent) as the sulfate source. For example, with acetate ion as the electron donor, the following reaction occurs:

$$CH_3COO^- + SO_4^{-2} \rightarrow 2HCO_3^- + HS^-$$

A mass balance on typical heap leach effluents has shown that biological reduction of contained sulfate ions produces bisulfide and sulfide ions in excess of the concentration required for essentially complete base metals precipitation (Hunter, 1989). Thus, production of a high concentration bisulfide lixiviant is possible.

A variety of techniques may be used to maximize bisulfide concentrations in the lixiviant. The solubility of hydrogen sulfides in water decreases with increasing temperature (from about 7,100 mg/l at 0° C. to 3,000 mg/l at 30° C. under a partial pressure of one atmosphere) (Environmental Protection Agency, *Process Design Manual for Sulfide Control in Sanitary Sewerage Systems*, EPA 625/1-74-005, October 1974). In accordance with Henry's law, the saturation concentration of $H_2S$ in water is directly proportional to the partial pressure of the gas in the atmosphere in contact with the liquid. Saturation of a solution with $H_2S$ lowers the pH of the solution (Melent'yev, B. N., Ivanenko, V. V., & Pamfilova, L. A., *Solubility of Some Ore-Forming Sulfides Under Hydrothermal Conditions*, 416-460, 1968). Moreover, the proportion of bisulfide ion (relative to $H_2S$) increases with pH over at least the range pH 5-9.

The optimal pH for the bisulfide lixiviant solution for precious metal recovery is the pH that maximizes the solubility of target precious metal compounds and the stability of their complexes. For example, Krauskopf noted that "one of the most perplexing facts about the chemistry of gold is its ability to dissolve in solutions of $HS^-$ of moderate concentration even at room temperature, whereas it dissolves in $S^{-2}$ (i.e., more alkaline solutions) only in concentrated solutions at high temperature." (Krauskopf, K. B., *Economic Geology*, 46, 858-870, 1951) Schwarzenbach and Widmer found that the solubility of silver was greatest at pH 7 at a temperature of 20° C. in the presence of excess sulfide in the form of $H_2S$, $HS^-$, and $S^{-2}$ (Schwarzenbach, von G., & Widmer, M., *Fasc. Emile Cherbuliez*, 49(16-17), 11-123, 1966). Melent'yev et al. found that the solubility of Ages increases with pH in the range pH 4-8 in the temperature range 100°-300° C. (Melent'yev, B. N., Ivanenko, V. V., & Pamfilova, L. A., *Solubility of Some Ore-Forming Sulfides Under Hydrothermal Conditions*, 416-460, 1968). Seward reported that for gold in solutions of reduced sulfur "a pronounced solubility maximum occurs in the region of pH about 7." (Seward, T. M., *Geochimica et Cosmochimica Acta*, 37, 379-399, 1973)

Options for reducing hydrogen fugacity include the hydrogen management techniques proposed by Harper and Pohland (Harper, S. R., & Pohland, F. G., *Biotechnology and Bioengineering*, 28 585–602, 1986). Free energy calculations can be used to determine whether enrichment of $H_2$-consuming sulfate-reducing bacteria (SRB) (and/or methanogenic bacteria) in the anaerobic reactor would reduce hydrogen levels sufficiently. Some SRB of the genera, Desulfosarcina and Desulfonema, for example, grow lithotrophically with $H_2$ as the electron donor, sulfate as the electron acceptor, and $CO_2$ as sole carbon source.

While both gold and silver are soluble in bisulfide solutions at atmospheric pressure and at room temperature, their solubilities generally increase with pressure and temperature (Krauskopf, K. B., *Economic Geology*, 46, 858–870, 1951; Weissberg, B. C., *Economic Geology*, 65, 551–556, 1970). For this reason, in an alternative embodiment, sulfate reduction reactor 8 is operated in the thermophilic (50°–100° C.) and barophilic (over one atmosphere) ranges (in a submerged, covered heap).

Precious metals recovery options include adsorption on activated carbon and modification of the solution pH, hydrogen fugacity, or oxidation-reduction potential (ORP). Options that do not otherwise modify lixiviant solution chemistry are preferable. For this reason, in preferred embodiments, at least reactors 8 and 22, and preferably also reactor 26, are operated together as a single, essentially completely-mixed reactor.

Figure 2:
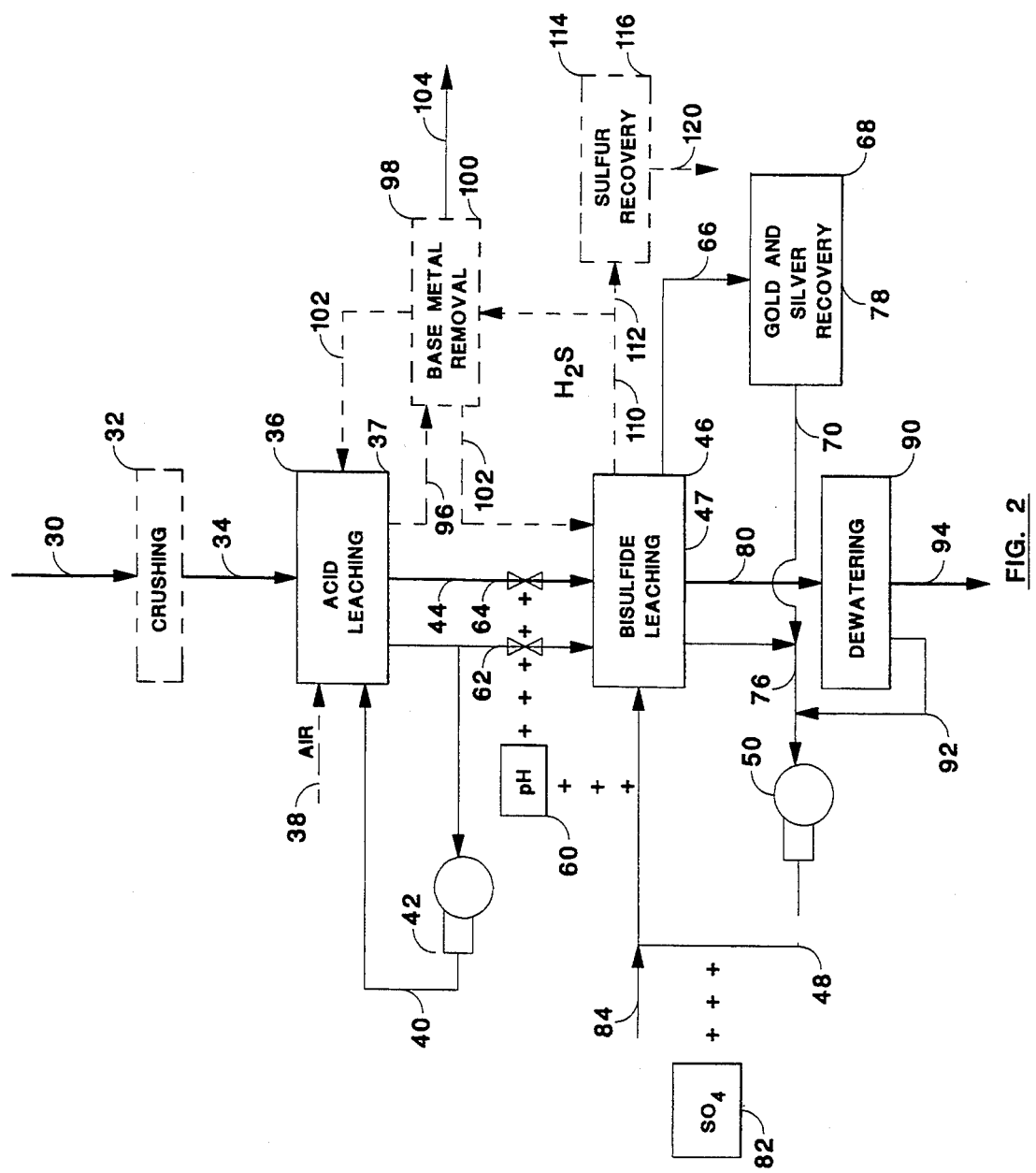
FIG. 2 is a highly schematic block diagram illustrating a second representative embodiment of the present invention.

Reference is now made to FIG. 2 which is a schematic diagram illustrating a second alternative representative embodiment of the invention, with dashed lines representing possible variations in the process and apparatus. In this embodiment, ore 30 preferably undergoes crushing 32 to facilitate exposure of precious metal values in the ore to processing solutions. Crushed ore 34 then undergoes acid leaching 36 in an aerobic reactor 37. If necessary, air 38 is added in the acid leaching step. Acid-leach solution 40 is recirculated through the ore undergoing acid leaching by means of pump 42.

Acid-leached ore 44 then undergoes bisulfide leaching 46 in essentially completely-mixed, anaerobic reactor 47. Bisulfide lixiviant 48 is recirculated through the ore undergoing bisulfide leaching by means of pump 50. The pH of bisulfide lixiviant 48 is established at an optimum pH by pH controller 60 which controls the rate of addition of acid-leached ore 44 and acid-leach solution 40 to reactor 47 by means of valves 62 and 64. The sulfate concentration in bisulfide lixiviant recirculation loop 76 is monitored by sensor/controller 82 which may comprise an ion-specific electrode. Sensor/controller 82 is programmed to add up to a stoichiometric amount of electron donor 84, which is a sulfate-reducing bacteria growth substrate such as acetate or methanol, to bisulfide lixiviant recirculation loop 76.

Pregnant bisulfide lixiviant 66 which contains precious metal values is subjected to gold and silver recovery 68. Spent lixiviant 70 is returned to bisulfide lixiviant recirculation loop 76. In a preferred embodiment, gold and silver recovery 68 is accomplished by passing pregnant bisulfide lixiviant 66 through activated carbon column 78.

Leached ore 80 undergoes dewatering 90 by conventional means, such as settling and/or vacuum filtration. Contained bisulfide lixiviant 92 is returned to bisulfide lixiviant recirculation loop 76. Waste ore 94 is disposed of using conventional means.

In an alternative embodiment, acid-leach solution portion 96 undergoes base metal removal 98 in base metal removal reactor 100. Excess hydrogen sulfide gas 110 removed from anaerobic reactor 47 is introduced to base metal removal reactor 100 to precipitate iron and other base metals 104. Acid-leach solution portion 102 having a reduced base metal content may be returned to reactor 37, or optionally, to reactor 47.

In an alternative embodiment, excess hydrogen sulfide gas portion 112 undergoes sulfur recovery 114 in sulfur recovery reactor 116. Recovery of element sulfur 120 may be accomplished by the conventional Claus process or by means of the process disclosed in U.S. Pat. No. 4,666,852, which disclosure is incorporated herein as if fully set forth.

Figure 3:
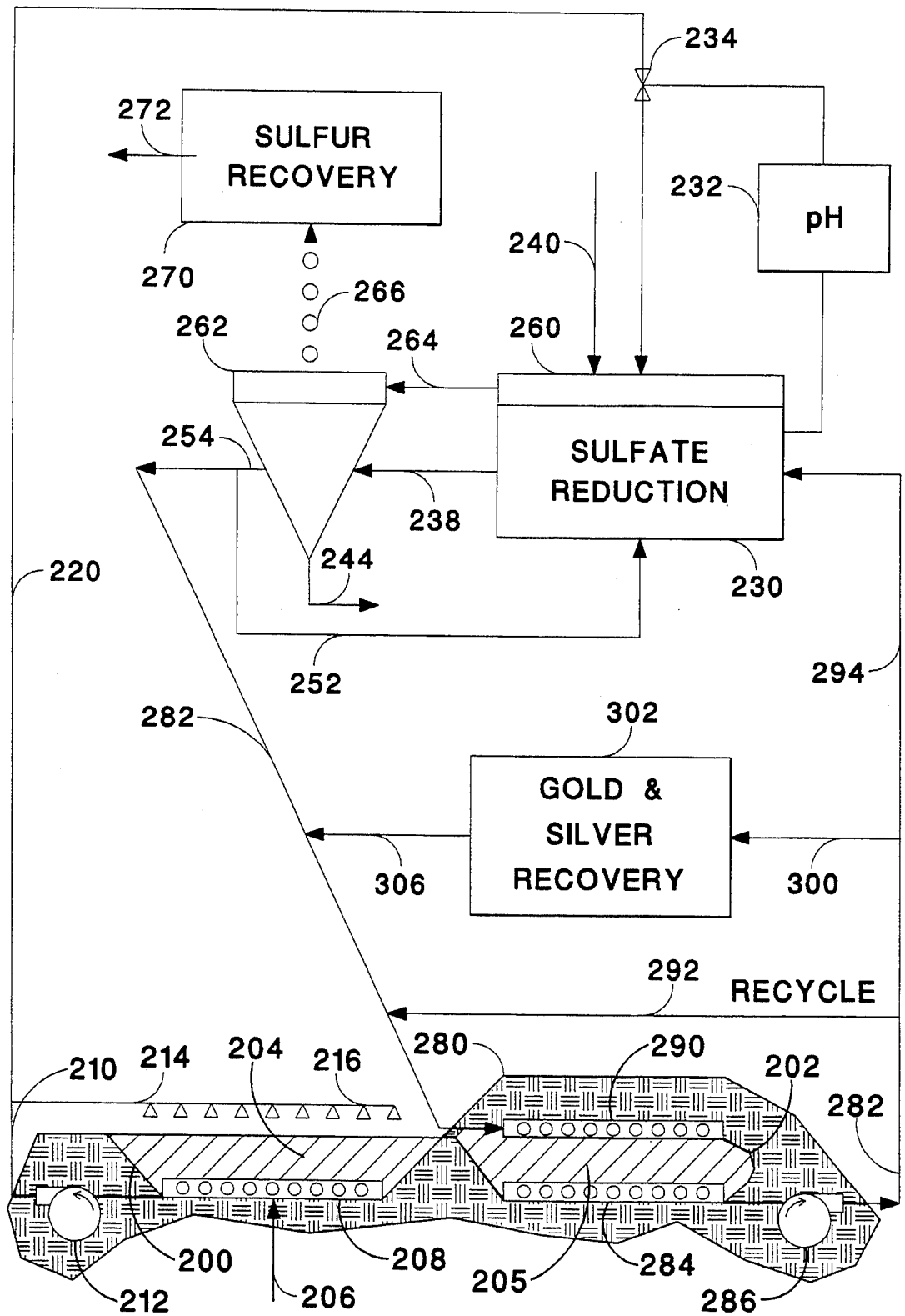
FIG. 3 is a highly schematic block diagram illustrating a third representative embodiment of the present invention.

Reference is now made to FIG. 3 which is a schematic diagram illustrating a third alternative representative embodiment of the invention, with dashed lines representing possible variations in the process and apparatus. In this embodiment, sequential processing of heaps 200 and 202 of crushed ore 204 and 205 is accomplished. In heap 200, conventional bio-oxidation of crushed ore particles 200 is accomplished to free precious metals dispersed or occluded within the ore. Air 206 may be introduced to heap 200 via plenum 208. Acidic, base-metal sulfate leach solution 210 is collected from the bottom of heap 200 through plenum 208 by means of pump 212. Portion 214 of leach solution is recirculated by means of pump 212 and distributor 216 to the top of heap 200.

As was noted above, bio-oxidation of heap 200 may include ore crushing, acid pretreatment, inoculation with appropriate sulfide-oxidizing bacteria, addition of nutrients, recirculating the biolixiviant and cooling the heap (for 3 to 8 days), and allowing the heap to "rest" (for 3 to 8 days). Additional process steps may include washing heap 200 for an extended period (e.g., 14 days) to remove residual acidity or iron content, and breaking heap 200 apart in order to agglomerate ore 202 with cement and/or lime to make a new heap, such as heap 202.

Portion 220 of acidic, base-metal sulfate leach solution 210 produced by the bio-oxidation step is introduced to anaerobic, sulfate-reduction reactor 230. In this embodiment of the process, reactor 230 is a sidestream reactor. The rate of addition of portion 220 to reactor 230 may be controlled by pH controller 232 which operates valve 234 to create an optimum pH for precious metals leaching in bisulfide leach solution 238 produced by reactor 230. Preferably, non-toxic electron donor 240, such as acetic acid (e.g., vinegar), acetate, or methanol (which does not bind effectively to activated carbon), is added to anaerobic reactor 230 to enrich within reactor 230 a culture of sulfate-reducing bacteria. Anaerobic reactor 230 is preferably operated in a pH-stat mode by adding a sufficient portion 220 of acidic sulfate solution to maintain a neutral pH in reactor 230.

In a preferred embodiment, base metals 244, such as iron, are precipitated in downstream settling tank 250 and portion 252 of clarified bisulfide lixiviant 254 is recirculated to reactor 230. The rate of recirculation of portion 252 is preferably chosen so that reactor 230 and settling tank 250 are operated together as a single, essentially completely-mixed reactor. Headspace 260 of reactor 230 and headspace 262 of settling tank 250 are preferably connected by conduit 264. Excess hydrogen sulfide gas ($H_2S$) 266 produced in anaerobic reactor 230 and tank 250 is preferably removed. In some embodiments, excess hydrogen sulfide gas undergoes sulfur recovery 270 to produce elemental sulfur 272. By means of reactor 230 and tank 250, sulfate-reducing bacteria are used to create clarified, approximately neutral (pH6 to 9) leaching solution 254 comprising bisulfide ions and a low concentration of dissolved and suspended base metals.

In a preferred embodiment, heap 200 is undergoing bio-oxidation while a second heap 202, which has previously undergone bio-oxidation undergoes leaching with bisulfide lixiviant. In a second process step, the oxidized ore 205 is preferably covered with cover 208 and submerged in bisulfide lixiviant 282 to exclude oxygen. Heap 202 is leached by recirculating portion 292 of neutral bisulfide lixiviant 282 saturated with $H_2S$ through it by means of plenum 284, pump 286, and distributor 290. In an alternative embodiment, the $H_2S$ partial pressure is increased by introducing the lixiviant under pressure at the bottom of a heap via plenum 284 which is submerged in lixiviant 282, causing $HS^{-1}$ ion concentrations to increase in direct proportion to the increase in $H_2S$ partial pressure. In a preferred embodiment, anaerobic reactor 230, settling tank 250, and heap 202 are operated together as a single, essentially completely-mixed reactor by recirculating portion 294 from heap 202 to reactor 230.

Complexed gold and silver in pregnant portion 300 of lixiviant 282 is recovered continuously from the lixiviant solution in reactor 302. Recovery may be accomplished in a conventional manner by adsorption on activated carbon or by precipitation on zinc dust or by modifying either the solution pH, hydrogen fugacity, or oxidation-reduction potential (ORP). Activated carbon or zinc dust may be smelted to recover precious metal values. Barren lixiviant solution 306 is recycled to heap 202.

EXAMPLE

Figure 4:
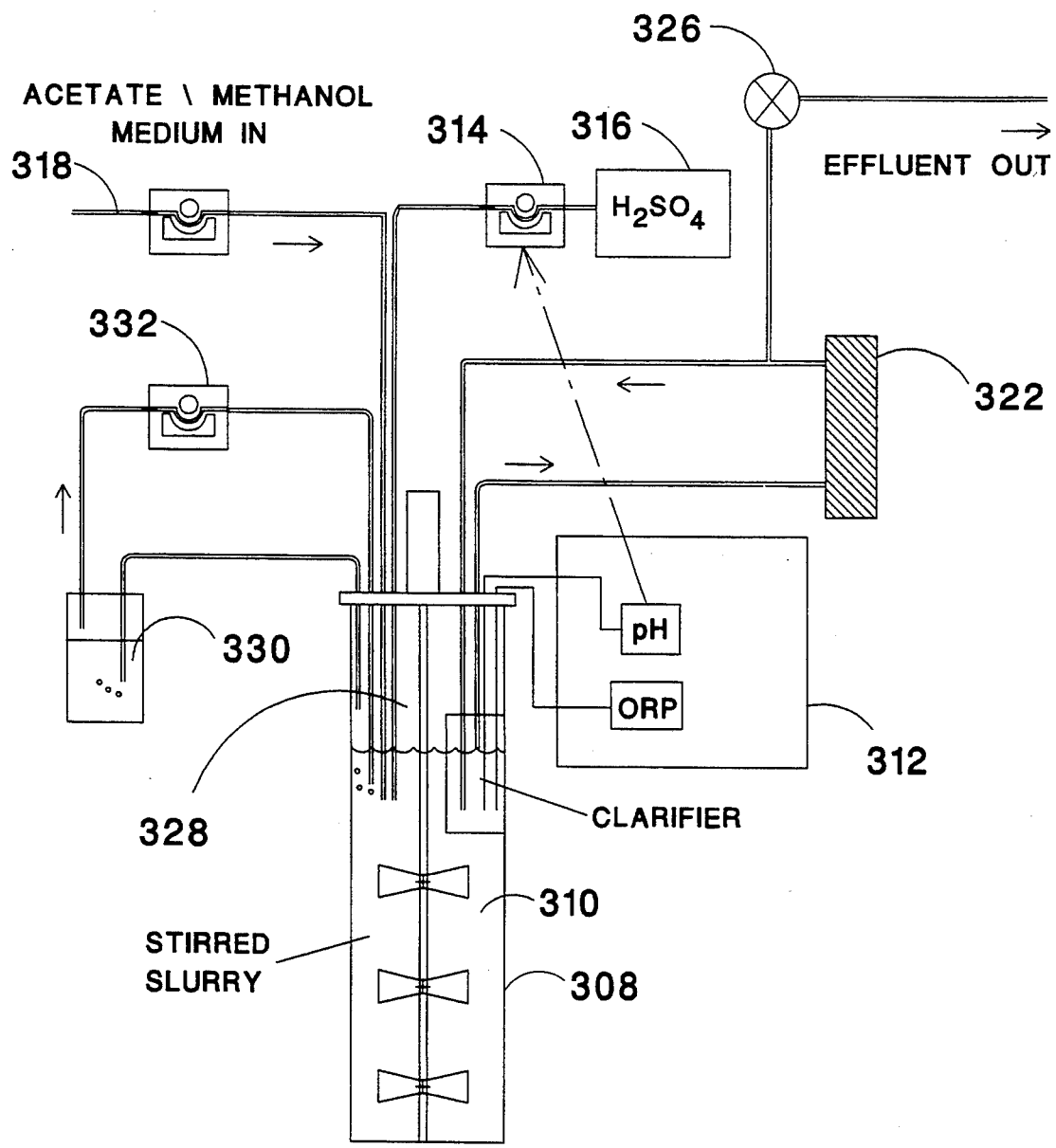
FIG. 4 is a highly schematic block diagram illustrating an example of the present invention.

As an example of the apparatus and process, an anaerobic continuous stirred tank reactor (CSTR) embodiment is presented in FIG. 4. CSTR 308 has a working volume of five liters and contains a 1–5 percent (weight to volume) slurry of <100 µm, oxidized ore particles to minimize mass transfer limitations. The requirement for anaerobiosis is met by using oxygen impermeable (and corrosion-resistant) materials (e.g., glass, butyl rubber, Teflon-coated stainless steel) in construction of the apparatus. The apparatus comprises personal computer-based process monitoring and control system 312 capable of accomplishing the following reactor monitoring tasks:

a. Monitor ORP and pH as well as selected lixiviant constituent concentrations.
b. Monitor and control reactor temperature and pressure.

All sensors are calibrated against NIST-traceable standards.

An initial series of experiments is used to optimize gold and silver extraction efficiencies for the process. The effects of changing variables, such as reactor set-point pH or electron donor, are assessed. In this example, a pH controlled set-point of 7.0 is used, sulfate is supplied by pump 314 from acid reservoir 316 in the form of 0.1 normal sulfuric acid, and medium pump 318 supplies 1 gram per liter of methanol in a mineral medium appropriate for sulfate-reducing bacteria is used to provide the electron donor. Ore from a working Montana gold/silver mine is crushed with a rock crusher to <100 µm size and divided in half into representative samples with a sample splitter. One sample is sent in for a gold assay and one sample with a weight of about 150 grams is loaded into the reactor.

The reactor is then filled to the five-liter mark with mineral medium containing methanol and inoculated with anaerobic sediment containing wild sulfate-reducing bacteria. Mineral medium containing methanol is then continuously added to the completely mixed reactor at a dilution rate of about 0.06 per hour. Dilute sulfuric acid is added to the reactor during the experiment at a rate that maintains a pH of 7.0. Supernatant from the reactor is continuously recirculated through a column of about 10 grams of activated carbon 322 at a flow rate approximately equal to the rate of addition of mineral medium to the reactor. Supernatant 324 is removed from the apparatus via solenoid valve 326, after activated carbon treatment, at the same rate that medium is added to the reactor and discharged to waste. Excess $H_2S$ is removed from the system by bubbling reactor headspace gas 328 through a reactor comprising a saturated solution of zinc acetate 330 by means of recirculation pump 332.

At the end of a 7-day leaching cycle, the remaining pregnant bisulfide lixiviant is removed from the reactor and contacted with the activated carbon column for gold recovery of the remaining gold and silver. Both the activated carbon and the ore sample are washed and assayed for gold content. Gold and silver assays are performed by a laboratory certified by the U.S. Environmental Protection Agency. After conventional sample preparation, assays are accomplished by fire assay with an A.A. finish.

Many variations of the invention will occur to those skilled in the art. All such variations within the scope of the claims are intended to be within the scope and spirit of the invention.

I claim:
1. A process for precious metal leaching comprising the steps of
   biologically reducing a dissolved sulfate under anaerobic conditions to produce a bisulfide lixiviant having an approximately neutral pH,
   leaching a first portion of an ore comprising at least one precious metal by exposing said ore to said bisulfide lixiviant, and
   recovering said at least one precious metal from said bisulfide lixiviant.
2. The process of claim 1 further comprising
   biologically oxidizing said first portion of an ore prior to said leaching step.
3. The process of claim 1 wherein said dissolved sulfate is produced by biologically oxidizing a second portion of an ore.
4. The process of claim 2 wherein said biologically reducing step and said leaching step are accomplished in a essentially completely mixed reactor and at a pH in the range of 6 to 8 units.
5. The process of claim 3 wherein said biologically oxidizing step occurs in a first heap of ore and said leaching step occurs in second heap of ore.
6. The process of claim 5 wherein said adsorbing step is comprised of exposing pregnant bisulfide solution to activated carbon and smelting said activated carbon.
7. An apparatus for precious metal leaching comprising means for biologically reducing a dissolved sulfate under conditions that produce a bisulfide lixiviant, whereas the conditions that produce a bisulfide lixiviant comprise
absence of oxygen,
presence of an electron donor,
presence of a source of carbon, and pH in the range of 6 to 9 units,
means for leaching a first portion of an ore comprising at least one precious metal by exposing said ore to said bisulfide lixiviant, and
means for recovering said at least one precious metal from said bisulfide lixiviant wherein the means for recovering said at least one precious metal from said bisulfide lixiviant is selected from the group consisting of
means for adsorbing said at least one precious metal on activated carbon,
means for changing the pH of said bisulfide lixiviant,
means for increasing the hydrogen fugacity of said bisulfide lixiviant,
means for changing the oxidation-reduction potential of said bisulfide lixiviant,
means for reducing the pressure of said bisulfide lixiviant, and
means for reducing the temperature of said bisulfide lixiviant.

8. The apparatus of claim 7 further comprising means for biologically oxidizing said first portion of an ore prior to its introduction into said means for leaching.

9. The apparatus of claim 7 wherein said dissolved sulfate is produced by means for biologically oxidizing a second portion of an ore.

10. The apparatus of claim 8 wherein said means for biologically reducing and said means for leaching comprise an essentially completely mixed reactor operated at a pH in the range of 6 to 8 units.

11. The apparatus of claim 9 wherein said means for biologically oxidizing comprises a first heap of ore and said means for leaching comprises a second heap of ore.

12. The apparatus of claim 11 wherein said means for adsorbing comprises means for exposing pregnant bisulfide solution to activated carbon and means for smelting said activated carbon.

13. A process for precious metal leaching comprising the steps of
biologically oxidizing an ore to free at least one precious metal dispersed or occluded within said ore and to produce a dissolved sulfate,
biologically reducing said dissolved sulfate under anaerobic conditions, in the presence of an electron donor, in the presence of a source of carbon, and at a pH between 6 and 9 to produce a bisulfide lixiviant,
leaching an oxidized ore comprising at least one precious metal by exposing said ore to said bisulfide lixiviant, and
recovering said at least one precious metal from said bisulfide lixiviant wherein the process for recovering said at least one precious metal from said bisulfide lixiviant is selected from the group consisting of
adsorbing said at least one precious metal or activated carbon,
changing the pH of said bisulfide lixiviant,
increasing the hydrogen fugacity of said bisulfide lixiviant,
changing the oxidation-reduction potential of said bisulfide lixiviant,
reducing the pressure of said bisulfide lixiviant, and
reducing the temperature of said bisulfide lixiviant.

14. The process of claim 13 wherein said ore is selected from the group consisting of
sulfitic ore
arsenosulfidic ore
and said at least one precious metal is selected from the group consisting of
gold,
silver, and
platinum.

15. An apparatus for precious metal leaching comprising
means for biologically oxidizing an ore to free at least one precious metal dispersed or occluded within said ore and to produce a dissolved sulfate,
means for biologically reducing said dissolved sulfate under anaerobic conditions, in the presence of an electron donor, in the presence of a source of carbon, and at a pH between 6 and 9 to produce a bisulfide lixiviant,
means for leaching an oxidized ore comprising at least one precious metal by exposing said ore to said bisulfide lixiviant, and
means for recovering said at least one precious metal from said bisulfide lixiviant wherein the means for recovering said at least one precious metal from said bisulfide lixiviant is selected from the group consisting of
means for absorbing said at least one precious metal or activated carbon,
means for changing the pH of said bisulfide lixiviant,
means for increasing the hydrogen fugacity of said bisulfide lixiviant,
means for changing the oxidation-reduction potential of said bisulfide lixiviant,
means for reducing the pressure of said bisulfide lixiviant, and
means for reducing the temperature of said bisulfide lixiviant.

16. The apparatus of claim 15 wherein
said means for biologically oxidizing ore comprises
means for ore crushing,
means for loading said ore into a heap,
means for acid pretreatment,
means for inoculation of said heap with sulfide-oxidizing bacteria,
means for addition of nutrients,
means for recirculating the biolixiviant,
means for cooling the heap,
means for allowing the heap to rest
means for washing the heap to remove residual acidity or iron content,
mean for breaking the heap apart, and
means for agglomerating said ore with cement and/or lime to make a new heap.

17. The apparatus of claim 15 further comprising a process monitoring and control system adapted to maintain said means for leaching at an approximately constant pH.

18. The apparatus of claim 15 wherein said means for adsorbing comprises a column of activated carbon through which a pregnant bisulfide lixiviant is continuously circulated.

19. The apparatus of claim 15 wherein
said means for leaching comprises a reactor comprising a solution of zinc acetate.

20. The apparatus of claim 15 wherein
said means for adsorbing is selected from the group consisting of
   means for practicing the carbon-in-column process,
   means for practicing the carbon-in-pulp process, and
   means for practicing the carbon-in-leach process,
said means for changing the pH is selected from the group consisting of
   means for lowering the pH to below pH 6, and
   means for increasing the pH to above pH 8,
said means for increasing the hydrogen fugacity comprise adding hydrogen gas, and
said means for changing the oxidation-reduction potential is selected from the group consisting of
   means for adding zinc dust, and
   means for adding oxygen.

* * * * *